United States Patent
Gonser et al.

(10) Patent No.: US 6,416,312 B1
(45) Date of Patent: Jul. 9, 2002

(54) CAM MECHANISM WITH SIDE ACTION FOR COMPRESSION MOLDING PROCESS

(75) Inventors: Heinz O. Gonser, Brownsburg; Xiaoli Ma, Crawfordsville; Wendell Willingham, Zionsville, all of IN (US)

(73) Assignee: Alcoa Closure Systems International, Crawfordsville, IN (US)

( * ) Notice: Subject to any disclaimer, the term of this patent is extended or adjusted under 35 U.S.C. 154(b) by 0 days.

(21) Appl. No.: 09/324,405

(22) Filed: Jun. 2, 1999

(51) Int. Cl.$^7$ .................... B29C 43/42; B29C 49/54
(52) U.S. Cl. .................. 425/525; 425/330; 425/422; 425/423; 425/438; 425/441; 425/DIG. 5; 425/DIG. 58; 425/DIG. 247
(58) Field of Search ................. 425/330, 438, 425/441, 422, DIG. 58, DIG. 247, 450.1, 809, 423, 528, DIG. 5, 525; 264/318; B29C 49/47, 49/54

(56) References Cited

U.S. PATENT DOCUMENTS

| | | | | |
|---|---|---|---|---|
| 3,337,910 A | * | 8/1967 | West ........................ | 425/181 |
| 3,816,580 A | * | 6/1974 | Valyi ......................... | 264/513 |
| 3,849,041 A | * | 11/1974 | Knapp ........................ | 425/110 |
| 4,076,484 A | * | 2/1978 | Armour et al. ............. | 425/525 |
| 4,147,748 A | * | 4/1979 | Saumsiegle ................. | 264/523 |
| 4,497,624 A | * | 2/1985 | Brun et al. ................. | 425/548 |
| 4,497,765 A | | 2/1985 | Wilde et al. | |
| 4,529,372 A | * | 7/1985 | Saumsiegle ................. | 425/528 |
| 4,571,171 A | * | 2/1986 | Blank et al. ................ | 425/533 |
| 4,640,673 A | | 2/1987 | Takeda et al. | |
| 4,765,585 A | * | 8/1988 | Wieder ....................... | 249/64 |
| 4,776,782 A | | 10/1988 | Murayama et al. | |
| 4,832,592 A | * | 5/1989 | Saumsiegle ................. | 425/525 |
| 4,971,543 A | * | 11/1990 | Minor ........................ | 425/193 |
| 5,234,329 A | * | 8/1993 | Vandenburg ................ | 425/186 |
| 5,531,588 A | * | 7/1996 | Brun, Jr. et al. ........... | 425/556 |
| 5,554,327 A | | 9/1996 | Ingram et al. | |
| 5,707,662 A | * | 1/1998 | Bright et al. ............... | 425/547 |
| 5,786,079 A | | 7/1998 | Alieri | |
| 6,095,788 A | * | 8/2000 | van Manen et al. ........ | 425/526 |
| 6,126,429 A | * | 10/2000 | Burger et al. .............. | 425/169 |

* cited by examiner

*Primary Examiner*—Robert Davis
*Assistant Examiner*—Emmanuel Luk
(74) *Attorney, Agent, or Firm*—Stephen D. Geimer; Edward L. Levine

(57) ABSTRACT

A compression molding apparatus includes a female mold half which receives a charge of molten plastic and a cooperating male plunger which compression molds the molten plastic into an article within the female mold half. A slide mold part is located between the male plunger and the female mold half. The slide mold part includes left and right slide mold halves which when brought into juxtaposition, define a central mold space. The left and right mold halves are slidable toward and away from each other, to form the central mold space and to open the central mold space respectively. The male portion is reciprocated downwardly to undertake the compression molding, and a cam mechanism is activated by the reciprocation to close the slide mold part during compression molding. The return stroke opens the slide mold part to allow removal of the molded article without stripping or unscrewing the molded article from the slide mold part. In an exemplary embodiment, a bottle-like container is formed by compression molding which includes a neck having an external thread. The external thread is formed in the central mold space of the slide mold part. The cam mechanism is arranged to open the slide mold part to release the threaded neck of the container for removal from the mold apparatus.

20 Claims, 5 Drawing Sheets

CAM MECHANISM WITH SIDE ACTION FOR COMPRESSION MOLDING PROCESS

FIELD OF THE INVENTION

The present invention relates to compression molding technology and in particular to a cam operated mechanism for operating a compression molding apparatus. In a compression molding apparatus, a female mold cavity receives a quantity or charge of moldable thermoplastic material, and a male plunger compresses the thermoplastic material within the female mold cavity to create the desired shape. The present invention provides a cam operated mechanism which, in response to axial movement between the female mold cavity and the male plunger, causes a side movement or lateral separation of a portion of the female mold cavity to allow removal of the compression molded article.

BACKGROUND OF THE INVENTION

Existing compression molding machines are used for producing articles such as closures for bottled liquids. In a rotary-type compression molding machine, a plurality of compression mold assemblies are arranged around a rotating carousel. Each assembly includes a mold formed by a male mold half (or "forming pin") and a cooperating female mold half (or "cavity") which are reciprocally, vertically opened and closed together to form compression molded articles such as bottle closures or caps. The mold halves are separated vertically or "opened" to receive a charge of molten plastic, and mated together vertically or "closed" to form the compression molded article. The halves are then separated and the article removed in a substantially vertical direction from one of the mold halves, such as by removal from the male mold forming pin. These steps occur progressively as the assemblies are circulated with the rotating carousel. These compression molded articles were heretofore limited to articles having shapes which could be removed from one of the mold halves in a direction parallel to a direction of separation of the mold halves.

As an example, bottle closures, such as threaded bottle caps, typically have inside threads. Once compression molded, the cap must be either unscrewed from the male mold half or stripped (forcibly removed in a non-rotary manner) from the male mold half to remove the closure. Typically, stripping can be successfully accomplished without unacceptable thread damage because the molded article is sufficiently thin-walled and flexible to be removed from the male mold half. U.S. Pat. No. 4,497,765, hereby incorporated by reference, describes compression molding of a bottle closure.

Although bottle caps with inside threads are effectively compression molded, other products having a more complex shape are difficult or impossible to remove after compression molding by simple separation of the male and female halves. External threads, for example, such as used on a bottle neck, are more difficult to strip or unscrew from within a female mold half. Unscrewing the completed article from the mold half requires more complex machinery and requires machine operating time, i.e., machine throughput is decreased. Also, articles molded of particularly rigid plastic material, or articles having thick walls, are sometimes difficult to strip from the male or female compression mold halves without damage to the articles.

It would be desirable to provide a mechanism for a compression molding apparatus which facilitated the removal of molded articles from the compression molding apparatus and which eliminated the requirement for stripping or unscrewing threaded articles from the mold.

SUMMARY OF THE INVENTION

In order to produce complex products like tamper evident closures with molded-in bridges, articles with holes in the radial direction, or articles with external threads, the compression mold of the present invention has a mold portion with the capability for side or lateral movement to open up the mold in a lateral direction after molding, to remove the molded article.

The invention contemplates a compression mold assembly which includes a mold formed between a relatively reciprocating male mold plunger and a female mold cavity, wherein a portion of a wall which at least partly defines the female mold cavity is movable in a lateral direction after molding, to allow removal of the molded article. The embodiments of the invention include a cam mechanism for actuating mold "side pulls" or levers to laterally disengage or separate the molded article from the female mold cavity in order to axially remove or eject articles from the compression molding machine. The use of cam mechanisms to provide lateral movement or "side actions" of a mold portion, activated by the relatively reciprocating male and female mold halves, is believed to be heretofore unknown in compression molding machines.

The present invention contemplates a cam mechanism for a compression molding apparatus having a mold formed by cooperating male and female mold halves and a slide mold part. The male and female mold halves are relatively reciprocated vertically toward and away from each other. The slide mold part is held relatively stationary in a vertical direction with the male mold half, and forms a female mold cavity together with the female mold half. The female mold cavity receives a male plunger of the male mold half to form an article in the space defined between the plunger and the female mold cavity.

The male and female mold halves are reciprocated vertically to sequentially receive a charge of moldable plastic, compress the moldable plastic into a shaped, compression molded article, and then separate to allow removal of the article from the mold. The cam mechanism interacts with at least one male or female compression mold half, or both male and female mold halves, to separate the slide mold part in a lateral direction to allow removal of the compression molded article.

In the preferred embodiment of the present invention, the axial separating of the male and female mold halves is used with the cam mechanism to provide horizontal and/or rotary cam motions to laterally separate or disengage the molded article from the mold to allow axial removal of the molded article from the mold. The axial engagement of the male and female mold halves is used with the cam mechanism to provide the required rotary and/or horizontal motions to laterally close the mold.

The female mold half can be provided with a connecting plate which can move with the female mold and which has cam slots therein. A linkage is operatively connected to the male mold half and to the slide mold part and includes cam followers or travelers guided within the cam slots. Vertical reciprocation between the male and female mold halves moves the cam followers within the cam slots which causes forced lateral movement, via the linkage, of the slide mold part.

Alternatively, in another embodiment, the cam plate can be replaced by a tube having a spiral cam slot formed therein, and a rod with a radially extending cam follower can be guided within the tube for vertical and rotary movement. The rod is rotated by the cam follower which follows the spiral cam slots, as the rod is moved vertically within the tube. The rod can be connected to a swing lever which extends radially outwardly to be connected at a distal end to the slide mold part.

The embodiments of the invention provide a compression molding apparatus with the ability to produce a broader range of products with varying shape complexity and the utilization of a broader range of plastic materials.

The present invention is particularly suited for compression molded containers, and in particular container preforms, having externally threaded necks, the necks molded within the slide mold part. The slide mold part is separable into two parts. Horizontal separation of the two parts by the cam mechanism releases the molded neck from the slide mold part so that the neck can be axially (vertically) removed from the slide mold part, and the container removed from the molding apparatus. As will be recognized, the present invention can also be employed for molding tamper-evident plastic closures having pilfer bands connected by frangible bridges. Such bridges can be molded by use of the horizontally movable components of the present molding apparatus.

Numerous other advantages and features of the present invention will become readily apparent from the following detailed description of the invention and embodiments thereof, from the claims, and from the accompanying drawings in which the details are fully and completely disclosed as part of the specification.

DETAILED DESCRIPTION OF THE PREFERRED EMBODIMENTS

Figure 1:
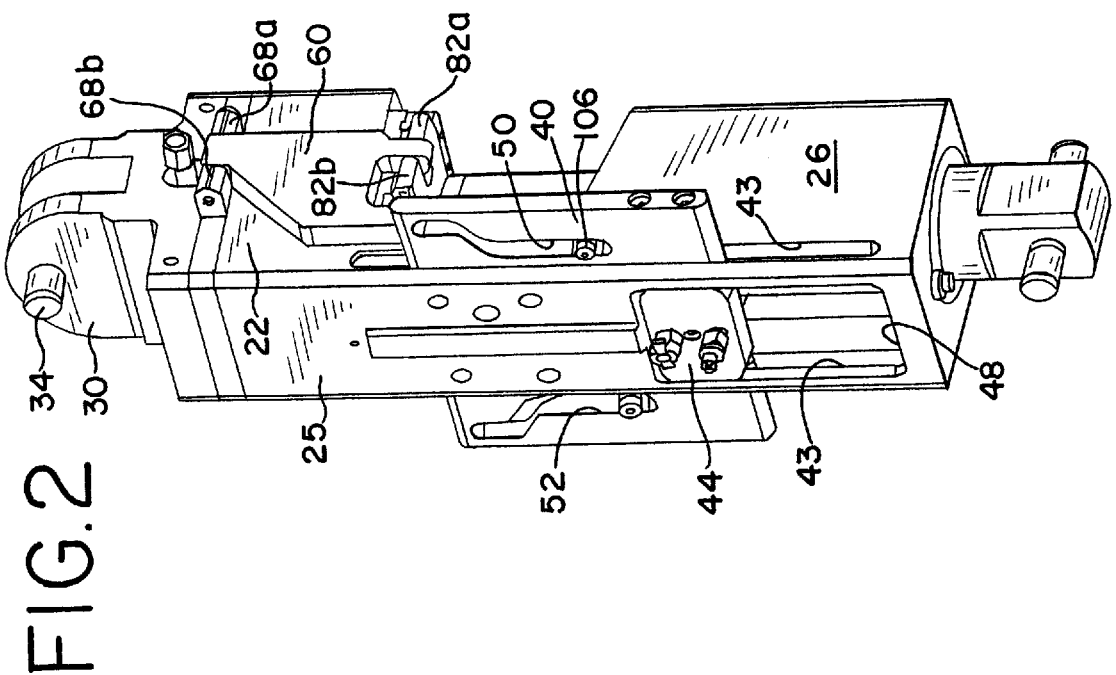
FIG. 1 is a perspective view of a compression mold assembly, including a mold cam mechanism, of the present invention.
Figure 2:
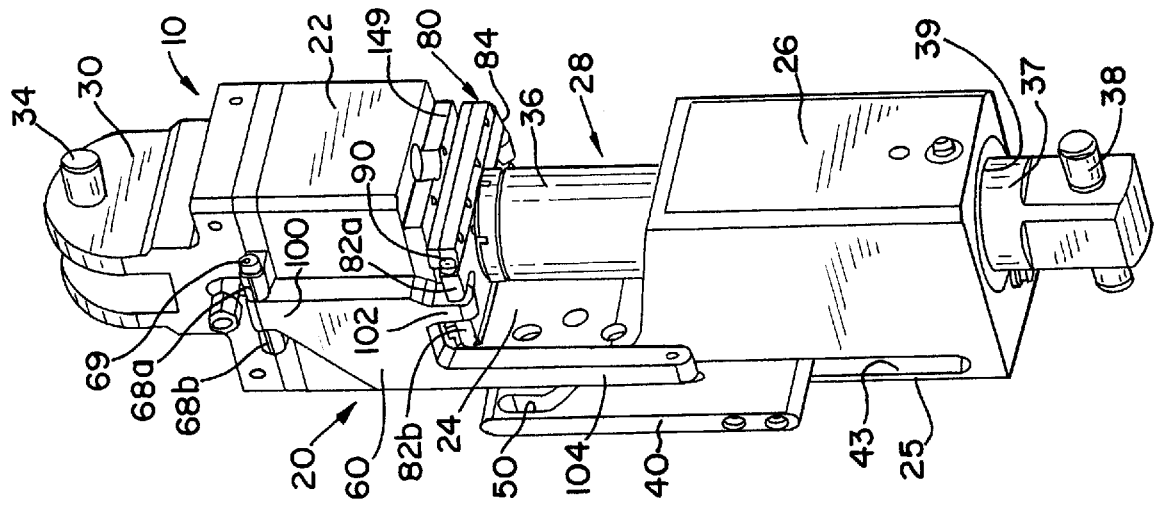
FIG. 2 is a rear perspective view of the compression mold assembly of FIG. 1.
Figure 5:
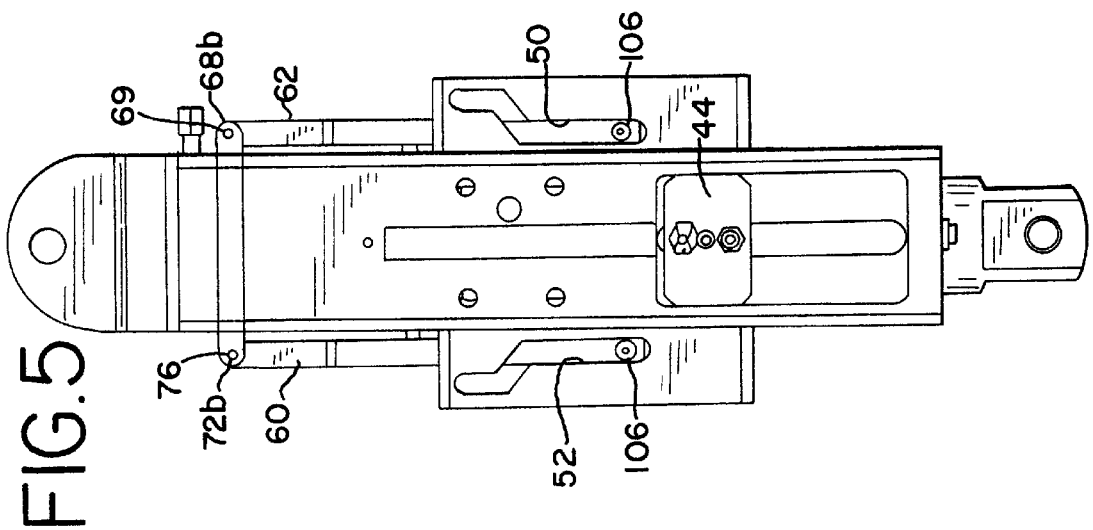
FIG. 5 is a rear view of the compression mold assembly of FIG. 1.
Figure 4:
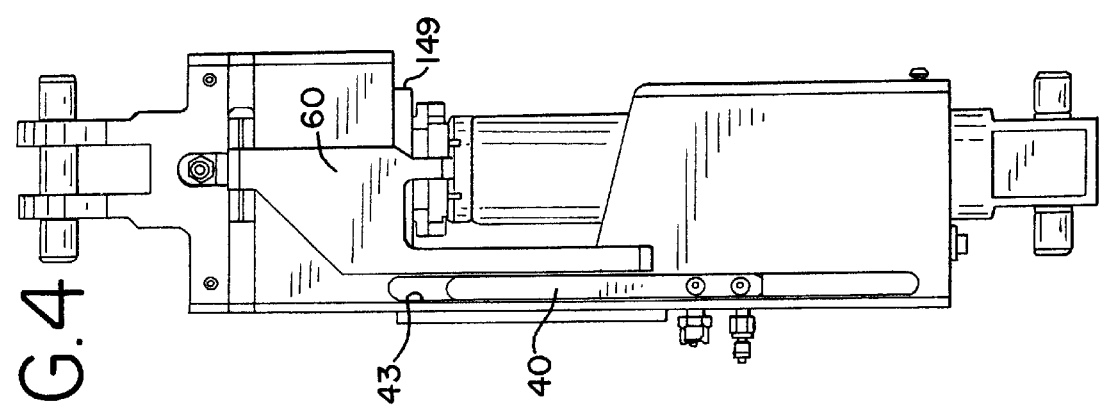
FIG. 4 is a left side view of the compression mold assembly of FIG. 1.
Figure 3:
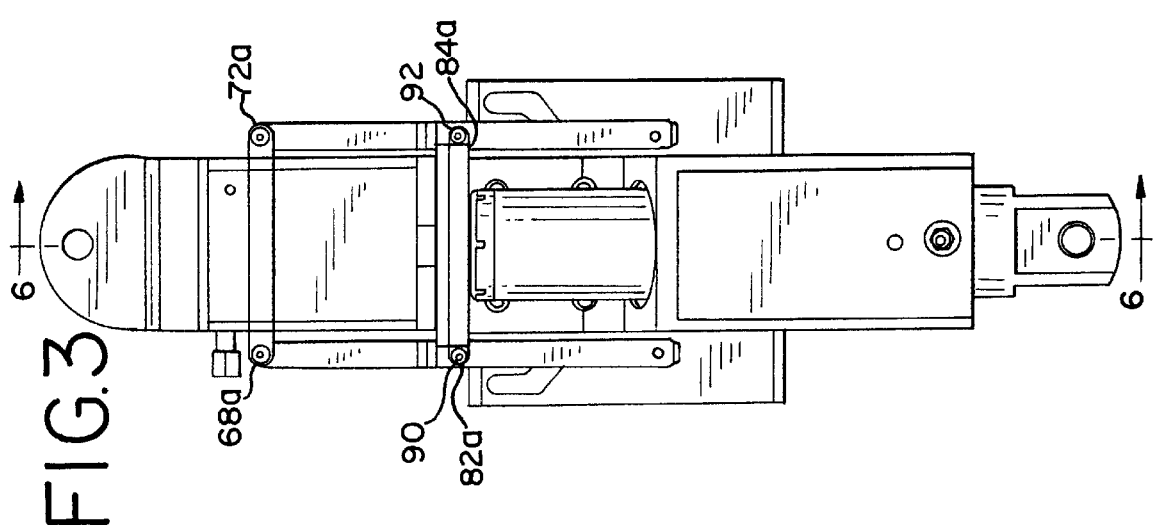
FIG. 3 is a front view of the compression mold assembly of FIG. 1.

While this invention is susceptible of embodiment in many different forms, there is shown in the drawings and will be described herein in detail, specific embodiments thereof with the understanding that the present disclosure is to be considered an exemplification of the principles of the invention and is not intended to limit this invention to the specific embodiments illustrated.

For simplicity of description, a particular orientation of the apparatus is described in the figures and the corresponding text. Terms such as "vertical" and "horizontal" are used for convenience and simplicity of description. The invention is not limited to any particular orientation.

FIGS. 1 through 5 illustrate a compression mold assembly 10 which includes a housing shown generally at 20. The housing 20 includes an upper housing part 22, an intermediate housing part 24, a back wall 25 and a lower housing part 26 which together define a central recess 28. The housing 20 is supported from an upper clevis 30 which journals an upper pin 34. Penetrating through the lower housing part 26 is a vertically movable female mold half 36 which extends to a lower lug 37 which journals a lower pin 38. The lower lug 37 extends downwardly from the lower housing part 26 through an aperture 39 thereof.

The upper pin 34 and the lower pin 38 are activated by a compression molding machine, such as a rotary type compression molding machine. The machine acts to vertically reciprocate the housing 20 with respect to the female mold half 36.

A slide plate 40 is connected to the female mold half 36 and reciprocates vertically therewith. The slide plate 40 reciprocates through a lateral guide slot 43 formed vertically through the upper housing part 22, the intermediate housing part 24 and the lower housing part 26, adjacent the back wall 25. A coolant manifold plate 44 carrying inlet and outlet nozzles is connected to the slide plate 40 to reciprocate vertically the rear guide slot 48 formed through the back wall 25, adjacent to the lower housing part 26.

The slide plate 40 includes a first cam slot 50 and a second cam slot 52 located outside lateral edges of the back wall 25 and which are shaped in mirror image fashion across a vertical center plane of the assembly. A first link arm 60 and a second link arm 62 are shaped and connected in mirror image fashion across the center vertical plane of the assembly. The first link arm 60 is connected to a parallel pair of first upper housing screw lugs 68a, 68b by a pivot pin or screw 69. The second link arm 62 is connected to a parallel pair of second upper housing screw lugs 72a, 72b by a second pivot pin or screw 76. The first and second upper housing screw lugs are fixed to, or formed unitary with, the upper housing part 22.

Beneath the upper housing part 22 is a slide female mold part 80 described in detail below. The slide female mold part 80 includes first slide mold screw lugs 82a, 82b and second slide mold screw lugs 84a, 84b arranged in mirror image fashion across the vertical center plane of the assembly. A first mold pivot pin or screw 90 and a second mold pivot pin or screw 92 pivotally connect the first and second link arms 60, 64 to the slide female mold part 80. The first and second link arms are pivotally connected to the upper housing screw lugs 68a, 68b, 72a, 72b at an upper arm pivot portion 100 and to the slide mold screw lugs 82a, 82b, 84a, 84b at a center pull arm portion 102, of each link arm. The center pull arm portions 102 each include an oversized or slotted hole (not shown) for receipt of the first and second pivot pins 90, 92 respectively.

A lower lever arm portion 104 of each link arm holds a traveler pin or cam follower 106, which can be a roller, each of which interfit into one of the cam slots 50, 52, respectively. When the female mold half 36 reciprocates downwardly, the traveler pins 106, moving through the cam slots 50, 52, cause the link arms 60, 64 to move outwardly at the lower lever arm portions 104. This causes the link arms 60, 64 to pivot upwardly and outwardly about the pins 69, 76 which in turn causes the center pull arm portions 102 to move outwardly, which pulls outwardly the slide female mold part 80 at each lateral edge thereof, i.e., separating the slide female mold part 80 into two parts or halves (shown in FIG. 7). The oversized or slotted holes through the center pull arm portions 102 for receiving the pins 90, 92, allow sufficient freedom for the swinging motion of the pull arm portions 102 to cause a linear reciprocating motion of slide female mold part halves.

Figure 6:
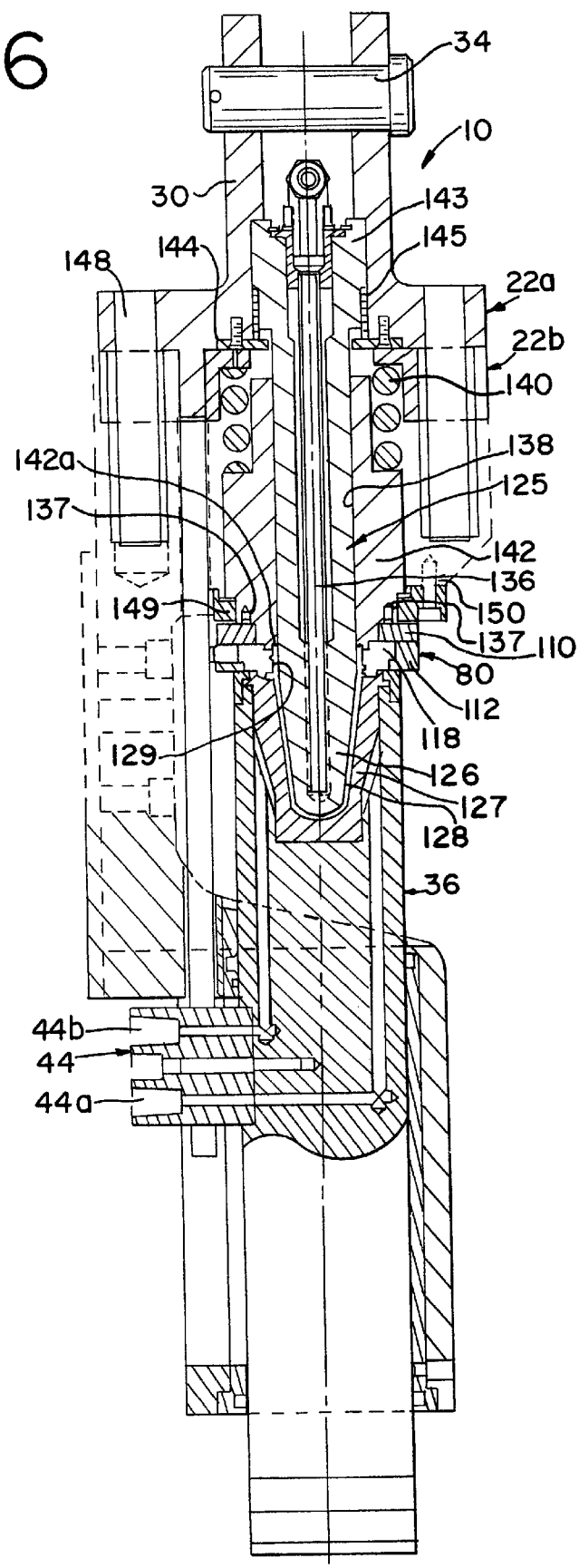
FIG. 6 is a longitudinal sectional view taken generally along lines 66 of FIG. 3.

As illustrated in FIG. 6, the assembly 10 includes a male mold half 125 which includes a male plunger 126 which cooperates with a female mold insert 127 and the slide female mold part 80 to form a compression molded article within a space 128 therebetween.

The slide female mold part 80 includes a central space 129 having, for example, grooves for forming external threads in the article molded. The slide female mold part 80 and the female mold insert 127 when engaged or mated, together form a female mold assembly defining a female mold cavity which receives the male plunger 126 to define the space 128. According to one exemplary embodiment, the space 128 is shaped to form a tube or container. The container can be a "preform" tube which, in a subsequent step, is blow-molded into a one or two liter plastic bottle. The slide female mold part 80 forms a neck, or threaded region of the container. Because the slide female part 80 can be laterally separated into two parts, the threaded neck region can be more easily removed from the mold in an axial direction without the need for stripping or unscrewing the neck region from the mold.

The male mold half 125 includes a coaxially arranged coolant inlet and outlet channel shown generally at 136 to cool the male plunger 126 during repeated compression molding operations, thus facilitating cooling of the molten plastic material placed in the mold. The coolant manifold plate 44 includes separate inlet and outlet cooling channels 44a, 44b for cooling the female insert 127.

The female mold half 36 is configured and shaped to sealingly mate with the slide female mold part 80 and receive the male plunger 126 during compression molding. The slide female mold part 80 is fixed by machine screws 137 to a male plunger guide block 142 which has a central passage 138 which guides the male plunger 126 for a small amount of reciprocation therein. A compression spring 140 is provided between the upper housing part 22 and the male plunger guide block 142 to control the closing force between the slide female mold part 80 and the female insert 127. The male plunger guide block 142 also substantially seals around the male plunger 126 at the slide female mold part 80, and also includes a thin annular region 142a which also partially defines the molding space 129.

The male mold half 125 includes a head portion 143 which is captured by the clevis 30 and a retaining plate 144 and supported on a spring 145. The spring 145 allows some differential movement between the housing 20 and the male mold half 125. However, reciprocation of the housing relative to the female mold half 36 also effectively reciprocates the male mold half 125 relative to the female mold half 36. The upper housing part 22 includes a top cover 22a which is fixed to an upper housing part body 22b by front and rear threaded studs 148. A second retaining plate 149 is held by screws 150 to the body 22b and includes a ledge 150a which captures a shoulder 142a of the guide block 142 to retain the block to the body 22b.

Figure 7:
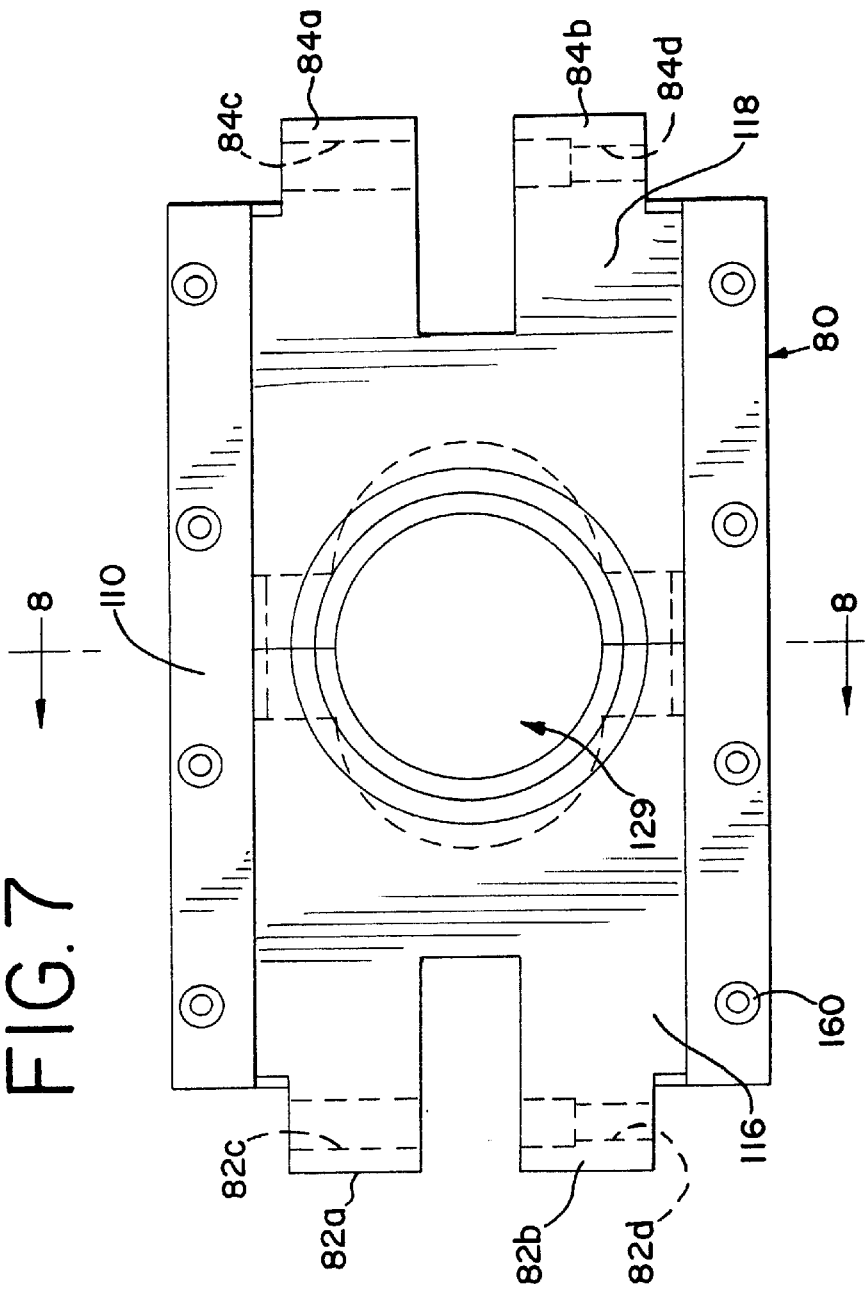
FIG. 7 is a plan view of a slide mold part from FIG. 1.
Figure 8:
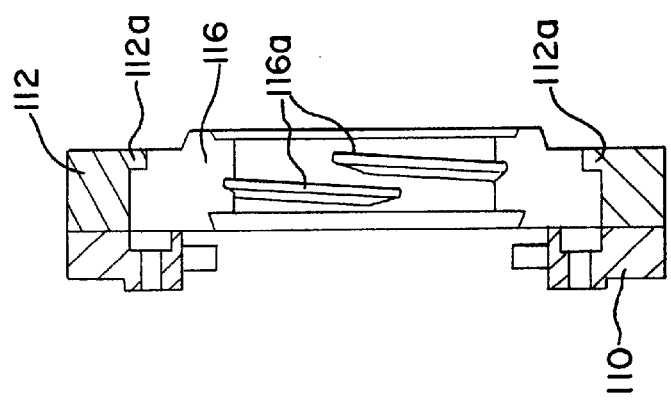
FIG. 8 is a sectional view of the slide mold part taken generally along line 8—8 of FIG. 7.

FIGS. 7 and 8 show in enlarged fashion the slide female mold part 80. The slide female mold part 80 includes slidable left and right slide mold parts or halves 116, 118 which slide into and out of the plane of FIG. 6 respectively. The left and right slide mold parts 116, 118 are guided by a top slide mold housing 110 and a lower slide mold housing 112. The slide mold screw lugs 82a, 82b, 84a, 84b include a plain bore 82c, 84c, and the screw lugs 82b, 84b include a threaded bore 82d, 84d, for receiving the pivot pins 90, 92. The pivot pins can include a threaded distal end for engagement with the threaded bores 82d, 84d.

The top slide mold housing 110 is screwed to the lower slide mold housing 112 by a plurality of machine screws 160. The lower slide mold housing 112 includes an inwardly directed lip 112a which in effect captures the left and right slide mold parts 116, 118 between the upper and lower slide mold housings 110, 112, to allow the left and right side mold parts 116, 118 to slide laterally between and along the housings 110, 112.

As can be understood from FIGS. 7 and 8, after the external threads are compression molded by thread formations 116a, 118a formed on inside surfaces of the space 129 formed by the left and right slide mold parts 116, 118, the slide mold parts 116, 118 can be separated (to the position shown dashed) such that the pressure molded article can be removed without stripping the thread from the mold. The threaded neck can now be simply axially removed such as by dropping down off of the male plunger 126 after the female mold half 36 has been retracted downwardly. The molded article can then be removed from its position within the recess 28 between the upper housing part 22 and the lower housing part 26.

It is observed that the cooperating male plunger 126 and female mold half 36 can be reciprocated toward and away from each other by forces exerted on the upper and lower pins 34, 38 such as by cams of a rotary molding apparatus. When the female mold half 36 is reciprocated downwardly relative to the upper housing part 22, the link arms 60, 62 slidably open left and right slide mold parts 116, 118 such that an article, such as a threaded neck of a molded container, can be easily removed without unscrewing or stripping.

The previously described embodiment for a compression mold assembly includes a slide female mold part being arranged substantially stationary in a vertical direction with the male mold half for sealingly engaging a relatively reciprocating female mold half. However, it is also within the scope of the invention to have the slide mold part relatively stationary in a vertical direction with the female mold half to receive and engage the relatively reciprocating male mold half.

Although as an example, the mold assembly for fashioning a compression molded container with an external thread has been described and illustrated in the figures, the invention applies to any complex compression molding operation which utilizes a reciprocation to employ the compression molding, and which reciprocation also serves to laterally open and close a portion of the mold for removing the molded piece.

Figure 9:
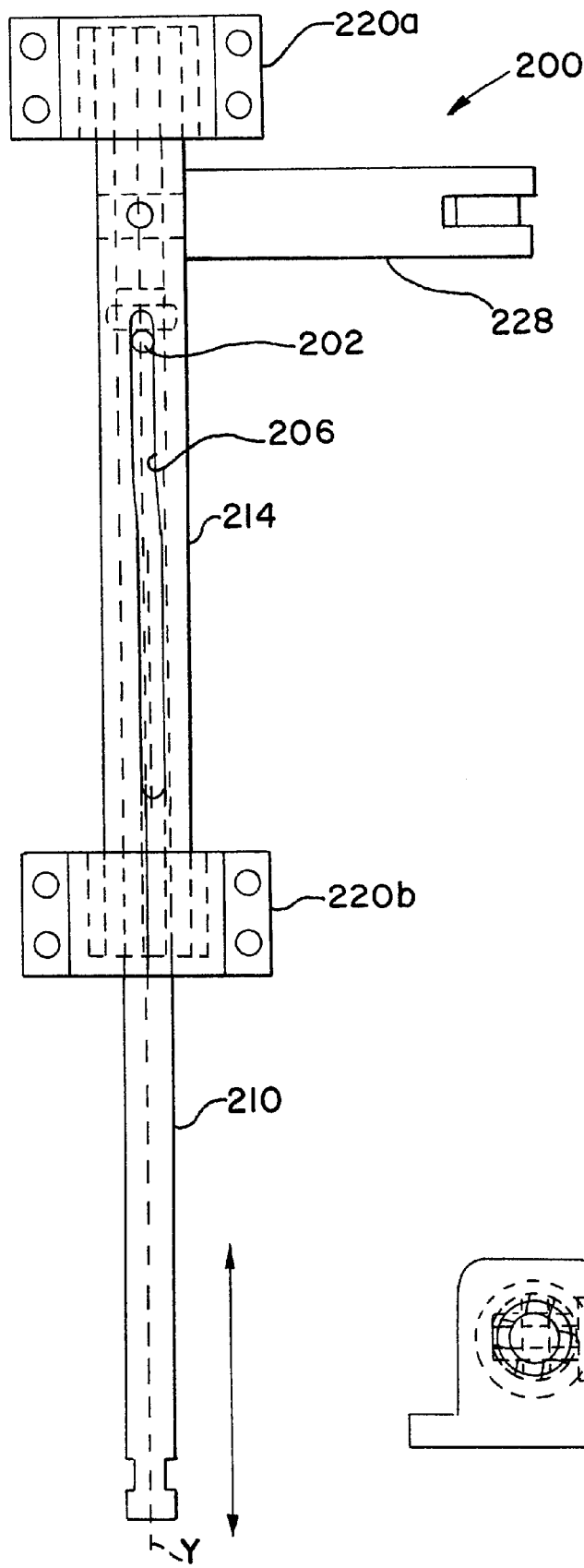
FIG. 9 is an elevation view of an alternate mold cam mechanism of the invention.
Figure 10:
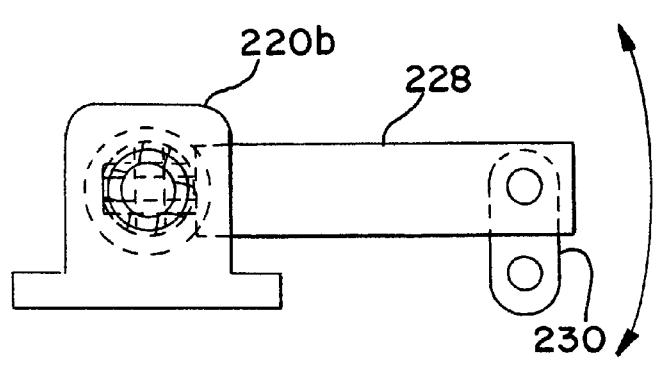
FIG. 10 is a bottom view of the alternate mold cam mechanism of FIG. 9.

FIGS. 1 through 8 illustrate a compression mold assembly which uses a cam mechanism having a cam follower slidable in a single plane within a cam slot, the cam follower connected to a pivotable linkage to create a lateral pull to slide open one or both halves of a slide female mold part 80. FIGS. 9 and 10 illustrate an alternate mold cam mechanism 200 which, instead of using a cam follower slidable within a cam slot oriented in a plane, uses a cam follower 202 which follows a spiral path within a spiral cam slot 206 up or down with the relative vertical movement of the mold halves (not shown). The cam follower 202 (such as a pin or roller) is thus turned about an axis, such as a parallel vertical axis Y. The cam follower is connected to a cam follower rod 210, and the rod fit within a tube 214, the tube having the spiral cam slot 206 formed or cut through its defining wall. The cam follower 202 is located within the slot to be guided thereby. The tube 214 is supported by brackets 220a, 220b which can be connected to support structure of the compression molding machine. The tube and rod can be respectively connected each to one of the reciprocating parts such as to the housing or the male plunger, and to the female mold half so that the reciprocating movement therebetween creates corresponding reciprocating movement between the tube and the rod.

The cam follower rod 210 can be connected to a lever 228 which pivots or swings about the parallel vertical axis Y with the turning of the cam follower 202 and rod 210 within the tube 206. This swinging motion of the lever can be used to pull horizontally at least one part of the slide female mold part 80 (not shown). For example, at a distal end of the lever 228 at a distance from the rod, a connecting plate 230 can be connected to one slide mold half to pull laterally the slide mold half upon relative vertical movement and relative rotation of the rod 210 with respect to the tube 214. A second such cam mechanism, featuring the rod and tube arrangement, with a second lever and connecting plate, could be similarly configured, such as in mirror image fashion, to pull open the respective opposite slide mold half.

From the foregoing, it will be observed that numerous variations and modifications may be effected without departing from the spirit and scope of the invention. It is to be understood that no limitations with respect to the specific apparatus illustrated herein is intended or should be inferred. It is, of course, intended to cover by the appended claims all such modifications as fall within the scope of the claims.

What is claimed is:

1. A compression molding apparatus, comprising:

a first mold portion and a second mold portion, said first and second mold portions having molding surfaces which at least partly define a molding cavity, and said first and second mold portions relatively longitudinally reciprocable along a first direction toward each other to compression mold an article, and away from each other to allow removal of the article and to receive a melted plastic pellet for compression molding;

one of said first and second mold portions including a wall portion which at least partially defines one of the molding surfaces, said wall portion laterally reciprocable along a second direction to close a portion of said molding cavity, and to open said portion of said molding cavity to increase a lateral clearance within said molding cavity; and a cam mechanism operatively connected to said first and second mold portions and to said wall portion to laterally move said wall portion along said second direction when said first and second mold portions are reciprocated along said first direction, said cam mechanism including a cam drive means for driving movement of said wall portion, whereby relative reciprocable movement of said first and second mold portions drives the movement of said wall portion, said cam mechanism is configured to move said laterally reciprocal wall portion to close said portion of said molding cavity before said first and second mold portion complete compression of said melted plastic pellet, and said cam mechanism is configured such that after said portion of said molding cavity is closed, said first and second mold portions continue to travel together to complete the compression molded article.

2. The apparatus according to claim 1, wherein said first mold portion includes a male plunger and a slide mold part, and said second mold portion includes a female mold insert having an open mold volume defining a portion of said molding cavity, and said slide mold part having a first mold volume further defining said molding cavity and in registry with said open mold volume of said female insert, said male plunger received into said first mold volume and said open mold volume to compression mold the article when said open mold volume and said first mold volume are in juxtaposition, said slide mold part comprising two mold portions which are separated by said cam mechanism to increase lateral clearance within said first mold volume to allow removal of a molded article.

3. The apparatus according to claim 2, wherein said two mold portions comprise two slide mold parts each with a central wall surface defining therebetween said first mold volume, each central wall surface having wall cavities to form external thread formations in a molded article, said two slide mold parts slidable together to form said first mold volume and slidable apart to release a molded article formed in said first mold volume, said cam mechanism connected to each of said slide mold parts to pull apart said slide mold parts as said female mold insert is reciprocated away from said male plunger.

4. A compression molding apparatus, comprising:

a first mold portion and a second mold portion, said first and second mold portions having molding surfaces which at least partly define a molding cavity, and said first and second mold portions relatively longitudinally reciprocable along a first direction toward each other to compression mold an article, and away from each other to allow removal of the article and to receive a melted plastic pellet for compression molding;

one of said first and second mold portions including a wall portion which at least partially defines one of the molding surfaces, said wall portion laterally reciprocable along a second direction to close said molding cavity for compression molding an article therein, and to open said molding cavity to increase a lateral clearance within said molding cavity;

a cam mechanism operatively connected to said first and second mold portions and to said wall portion to laterally move said wall portion along said second direction when said first and second mold portions are reciprocated along said first direction, said cam mechanism including a cam drive means for driving movement of said wall portion, whereby relative reciprocable movement of said first and second mold portions drive s the movement of said wall portion;

wherein said first mold portion includes a male plunger and a slide mold part, and said second mold portion includes a female mold insert having an open mold volume defining a portion of said molding cavity, and said slide mold part having a first mold volume further defining said molding cavity and in registry with said open mold volume of said female insert, said male plunger received into said first mold volume and said open mold volume to compression mold the article when said open mold volume and said first mold volume are in juxtaposition, said slide mold part comprising two mold portions which are separated by said cam mechanism to increase lateral clearance within said first mold volume to allow removal of a molded article;

wherein said two mold portions comprise two slide mold parts each with a central wall surface defining therebetween said first mold volume, each central wall surface having wall cavities to form external thread formations in a molded article, said two slide mold parts slidable together to form said first mold volume and slidable apart to release a molded article formed in said first mold volume, said cam mechanism connected to each of said slide mold parts to pull apart said slide mold parts as said female mold insert is reciprocated away from said male plunger;

wherein said cam drive means of said cam mechanism comprises a plate slidable with said female mold insert and having two substantially longitudinally oriented cam slots which have end slot regions which diverge from each other, and first and second linkages each having a traveler pin riding in one of said cams slots, said linkages operatively pinned to said male plunger and each operatively connected to opposite sides of said slide mold part to separate said halves of said slide mold part for longitudinal removal of said molded article.

5. A compression molding apparatus, comprising:

a first mold portion and a second mold portion, said first and second mold portions having molding surfaces which at least partly define a molding cavity, and said first and second mold portions relatively longitudinally reciprocable along a first direction toward each other to compression mold an article, and away from each other to allow removal of the article and to receive a melted plastic pellet for compression molding;

one of said first and second mold portions including a wall portion which at least partially defines one of the molding surfaces, said wall portion laterally reciprocable along a second direction to close said molding cavity for compression molding an article therein, and to open said molding cavity to increase a lateral clearance within said molding cavity; and a cam mechanism operatively connected to said first and second mold portions and to said wall portion to laterally move said wall portion along said second direction when said first and second mold portions are reciprocated along said first direction, said cam mechanism including a cam drive means for driving movement of said wall portion, whereby relative reciprocable movement of said first and second mold portions drives the movement of said wall portion;

wherein said cam mechanism comprises a plate slidable with said second mold portion, said plate having a cam slot formed therein and a linkage having a traveling pin residing in said cam slot, said linkage operatively connected at a pivot point to said first mold portion and connected to said wall portion, sliding of said plate causing said traveling pin to pivot said linkage at said pivot point to move said wall portion laterally.

6. A compression molding apparatus, comprising:

a female mold assembly and a male plunger;

said female mold assembly comprising a wall at least partially defining a female mold cavity for receiving the male plunger, a first portion of said wall reciprocable longitudinally relative to said male plunger, and a second portion of said wall is movable laterally, said male plunger traveling into said female mold cavity to compress a melted plastic pellet therein;

a cam mechanism operatively connected between and driven by relative reciprocation of said male plunger and said first portion of said wall and having a portion drivingly, operatively connected to said second portion of said wall, reciprocation of said first portion of said wall with respect to said male plunger driving said cam mechanism to drive lateral movement of said second portion of said wall to increase a lateral dimension in at least a portion of said female mold cavity;

said cam mechanism is configured to move said second portion of said wall to close a portion of said female mold cavity before said male plunger completely compresses said melted plastic pellet, and said cam mechanism is configured such that after said portion of said female mold cavity is closed, said male plunger continues to travel to complete the compression molded article.

7. The apparatus according to claim 6, wherein said female mold assembly includes a female mold insert having an open mold volume defining a portion of said female mold cavity, and a slide female mold part having a first mold volume defining a further portion of said female mold cavity and in registry with said open mold volume of said female mold insert, said slide female mold part comprising two mold portions which can be relatively separated by said cam mechanism to increase a lateral clearance within said first mold volume.

8. A compression molding apparatus, comprising:

a female mold assembly and a male plunger;

said female mold assembly comprising a wall at least partially defining a female mold cavity for receiving the male plunger, a first portion of said wall reciprocable longitudinally relative to said male plunger, and a second portion of said wall is movable laterally;

a cam mechanism operatively connected between and driven by relative reciprocation of said male plunger and said first portion of said wall and having a portion drivingly, operatively connected to said second portion of said wall, reciprocation of said first portion of said wall with respect to said male plunger driving said cam mechanism to drive lateral movement of said second portion of said wall to increase a lateral dimension in at least a portion of said female mold cavity;

wherein said cam mechanism comprises a plate slidable with said first portion of said wall, said plate having a cam slot formed therein, and a linkage having a traveler pin residing in said cam slot, said linkage operatively connected at a pivot point to said male plunger and connected to said second portion of said wall, sliding of said plate causing said traveler pin to pivot said linkage at said pivot point to move said second portion of said wall laterally.

9. The apparatus according to claim 7, wherein said two mold portions comprise two slide mold parts each with a central wall surface defining therebetween said first mold volume, each central wall surface having wall cavities to form external thread formations in a molded article, said two slide mold parts slidable together to form said first mold volume and slidable apart to release a molded article formed in said first mold volume, said cam mechanism connected to each of said slide mold parts to pull apart said slide mold parts as said first portion of said wall is reciprocated away from said male plunger.

10. The apparatus according to claim 9 wherein said first portion of said wall includes a female mold insert which upon relative upward recriprocation thereof to said male plunger, sealingly mates with said slide female mold part.

11. A compression molding apparatus, comprising:

a female mold assembly and a male plunger;

said female mold assembly comprising a wall at least partially defining a female mold cavity for receiving the male plunger, a first portion of said wall reciprocable longitudinally relative to said male plunger, and a second portion of said wall is movable laterally;

a cam mechanism operatively connected between and driven by relative reciprocation of said male plunger and said first portion of said wall and having a portion drivingly, operatively connected to said second portion of said wall, reciprocation of said first portion of said wall with respect to said male plunger driving said cam mechanism to drive lateral movement of said second portion of said wall to increase a lateral dimension in at least a portion of said female mold cavity;

wherein said female mold assembly includes a slide female mold part having laterally separatable halves, wherein said cam mechanism comprises a plate slidable with said first portion of said wall and having two substantially longitudinally oriented cam slots which have end slot regions which diverge from each other, and first and second linkages each having a traveler pin riding in one of said cams slots, said linkages operatively pinned to said male plunger and each operatively connected to opposite sides of said slide female mold part to separate said halves of said slide female mold part for longitudinal removal of said molded article.

12. A compression molding apparatus, comprising:

a housing;

a female mold assembly and a male mold element;

said female mold assembly comprising a slide female mold assembly held vertically stationary with respect to said housing and defining a first mold cavity and a female mold insert vertically movable with respect to said housing and defining a second mold cavity, said first and second mold cavities positionable in juxtaposition for receiving the male mold element to compress a melted plastic pellet therein when said female mold assembly and said male mold element are in a first relative position; and when the female mold assembly and the male mold element are moved into a second relative position, said slide female mold assembly is arranged and configured to be separated laterally into two mold slide parts to increase lateral clearance in said first mold cavity, and said female mold insert is arranged and configured to be vertically separated from said slide mold assembly and from said male mold element; and a cam mechanism drivingly, operatively connected between said male mold element and said female mold insert and having a portion connected to said two slide mold parts, reciprocation of said female mold insert with respect to said male mold element driving said cam mechanism to drive said se pa ration of said slide female mold assembly;

said cam mechanism and said portion connected to said two side mold parts are configured to close said two slide mold parts together to define said first mold cavity before said male mold element completes compression of said melted plastic pellet, and said cam mechanism and said portion connected to said two slide mold parts are configured such that after said two slide mold parts are brought together, said male mold element continues to travel to complete the compression molded article.

13. A compression molding apparatus, comprising:

a housing;

a female mold assembly and a male mold element;

said female mold assembly comprising a slide female mold assembly held vertically stationary with respect to said housing and defining a first mold cavity and a female mold insert vertically movable with respect to said housing and defining a second mold cavity, said first and second mold cavities positionable in juxtaposition for receiving the male mold element therein when in a first position; and when moved into a second position, said slide female mold assembly arranged and configured to be separated laterally into two mold slide parts to increase lateral clearance in said first mold cavity, and said female mold insert arranged and configured to be vertically separated from said slide mold assembly and from said male mold element; and a cam mechanism drivingly, operatively connected between said male mold element and said female mold insert and having a portion connected to said two slide mold parts, reciprocation of said female mold insert with respect to said male mold element driving said cam mechanism to drive said separation of said slide female mold assembly;

wherein said cam mechanism comprises a plate slidable with said female mold insert, said plate having a cam slot formed therein, and a linkage having a traveler pin residing in the cam slot, said linkage operatively pinned to said male mold element and connected to at least one of said two slide parts, sliding of said plate causing said traveler pin to pivot said linkage to separate said two slide mold parts.

14. The apparatus according to claim 12, wherein said first mold cavity defines thread formations.

15. A compression molding apparatus, comprising:

a housing;

a female mold assembly and a male mold element;

said female mold assembly comprising a slide female mold assembly held vertically stationary with respect to said housing and defining a first mold cavity and a female mold insert vertically movable with respect to said housing and defining a second mold cavity, said first and second mold cavities positionable in juxtaposition for receiving the male mold element therein when in a first position; and when moved into a second position, said slide female mold assembly arranged and configured to be separated laterally into two mold slide parts to increase lateral clearance in said first mold cavity, and said female mold insert arranged and configured to be vertically separated from said slide mold assembly and from said male mold element; and a cam mechanism drivingly, operatively connected between said male mold element and said female mold insert and having a portion connected to said two slide mold parts, reciprocation of said female mold insert with respect to said male mold element driving said cam mechanism to drive said separation of said slide female mold assembly;

wherein said cam mechanism comprises a plate slidable with said female mold insert and having two cam slots which have slot end regions which diverge from each other, and first and second linkages each having a traveler pin riding in one of said cam slots, said linkages pinned to said male mold element and connected to opposite sides of said two slide mold parts to separate said two slide parts for removal of said molded article.

16. The compression molding apparatus according to claim 1 wherein said first direction is a vertical direction and said second direction is a horizontal direction.

17. The compression molding apparatus according to claim 6 wherein said longitudinal direction is a vertical direction and the lateral direction is a horizontal direction.

18. The compression molding apparatus according to claim 1 further comprising:
- a plurality of further first mold portions and further second mold portions each respectively identical to said first mold portion and said second mold portion; and
- a plurality of further cam mechanisms identical to said cam mechanism and each of said plurality of further cam mechanisms respectively operatively associated with one said further first and second mold portions;
    said plurality of further first and second mold portions and respective plurality of cam mechanisms arranged around a circular carousel and circulated by rotation of said carousel, wherein said further first and second mold portions are relatively reciprocated by rotary movement of said carousel.

19. The compression molding apparatus according to claim 6, further comprising:
- a plurality of units each comprising a further female mold assembly and a further male plunger and a further cam mechanism identical to said female mold assembly, said male plunger and said cam mechanism, respectively, said plurality arranged around a circular carousel and circulated by rotation of said carousel, wherein first portions of walls of said further female mold assemblies and said further male plungers are relatively reciprocated by rotary movement of said carousel.

20. A compression molding apparatus according to claim 12, further comprising:
- a plurality of units each comprising a further female mold assembly and a further male mold element and a further cam mechanism identical to said female mold assembly, said male mold element and said cam mechanism, respectively, said plurality arranged around a circular carousel and circulated by rotation of said carousel, wherein rotary movement of said carousel relatively reciprocates female mold inserts of said further female mold assemblies and respective male mold elements.

* * * * *